United States Patent [19]

Vuagnat

[11] Patent Number: 4,881,755
[45] Date of Patent: Nov. 21, 1989

[54] STEERING DEVICE FOR MOTOR VEHICLE

[76] Inventor: Eric Vuagnat, Carre d'Aval, 1252 Meinier, Switzerland

[21] Appl. No.: 228,736

[22] Filed: Aug. 5, 1988

[30] Foreign Application Priority Data

Aug. 5, 1987 [CH] Switzerland .................. 3007/87

[51] Int. Cl.⁴ ............................................. B62D 1/18
[52] U.S. Cl. ................................................... 280/779
[58] Field of Search ............ 280/778, 777, 774, 81.5, 280/87.041, 81.4, 779; 74/492

[56] References Cited

U.S. PATENT DOCUMENTS

| 4,509,775 | 4/1985 | Arndt | 280/779 |
| 4,526,249 | 7/1985 | Parker | 180/219 |
| 4,738,469 | 4/1988 | Ushijima et al | 280/779 |

FOREIGN PATENT DOCUMENTS 3537522 4/1987 Fed. Rep. of Germany.
2514715 4/1983 France.

Primary Examiner—Richard A. Bertsch
Attorney, Agent, or Firm—Young & Thompson

[57] ABSTRACT

The invention relates to a new and advantageous steering device which comprises a handle bar 1, pivoted on the frame of a vehicle, connected to a support 3 of the bearing 4 of a wheel. Said support 3 is connected to the frame of the machine by means of the suspension system. The handle bar 1 is fixed to a steering rod 2 which is hinged onto the support 3 of the bearing 4 through a double articulation the pivoting axis X of which onto the support 3 of the bearing 4 is located in a plane parallel to the axis Y of the bearing 4 intended to receive the axle of the wheel.

7 Claims, 2 Drawing Sheets

STEERING DEVICE FOR MOTOR VEHICLE

The present invention has for its object a steering device for a motor vehicle and more particularly for motor cycles, side-cars and three wheel vehicles.

When telescopic forks were used on motor cycles and side-cars for the front suspension it was relatively easy by means of a direct linkage between the handle bar and the hub of the front wheel to make a precise steering device, without play and induced parasitic movements.

Particularly for the racing machines one has been led to use very large pneumatics and to realize suspensions having deformable trapezes or parallelograms to enhance the ground holding and reduce during the braking the overload of the front wheel. However it was no longer possible to realize a monolytic steering device and different systems have been developed permitting a cantilevered mounting of the front wheel and the lateral displacement, or at least a part of it, of the linkage between the hub of the wheel and the handle bar to pass on the side of the large wheels. These linkages have necessarily one or more hinges, the handle bar being pivoted onto the frame of the machine whereas the wheel is mounted on said frame but through the intermediary of the suspension.

In all steering systems of this type which now exist one encounters in the curves the so-called phenomenon of the induced turning, that is if the suspension works in curves, the displacements caused induce an oscillation of the handle bar around its pivoting point and this is very inconvenient for the driver. Usually the pilots maintain strongly the handle bar in turning position in the curves, preventing it from oscillating, but then it is the wheel, which due to the movements of the suspension, undergoes oscillations modifying the position of its plan causing modifications of the trajectory and an oscillation of the whole machine. The speed in curves is therefore limited since otherwise one cannot avoid falling down or going out of the runway.

The present invention has for its object a steering device for motor vehicle, particularly for motor cycles and side-cars of the type comprising at least one hinge comprising a handle bar, intended to be pivoted without play on the frame of the vehicle, connected to a support of the bearing of a wheel, intended to be connected to the frame of the machine through the intermediary of its suspension, characterized by the fact that the handle bar is fixed to with a steering rod; that this steering rod is hinged onto the support of the bearing by means of a double articulation the pivoting axis of which onto said support of the bearing is located in a plane parallel to the axis of said bearing which is intended to receive the axle of the wheel.

The attached drawing shows schematically and by way of example two embodiments of the steering device according to the invention.

Figure 1:
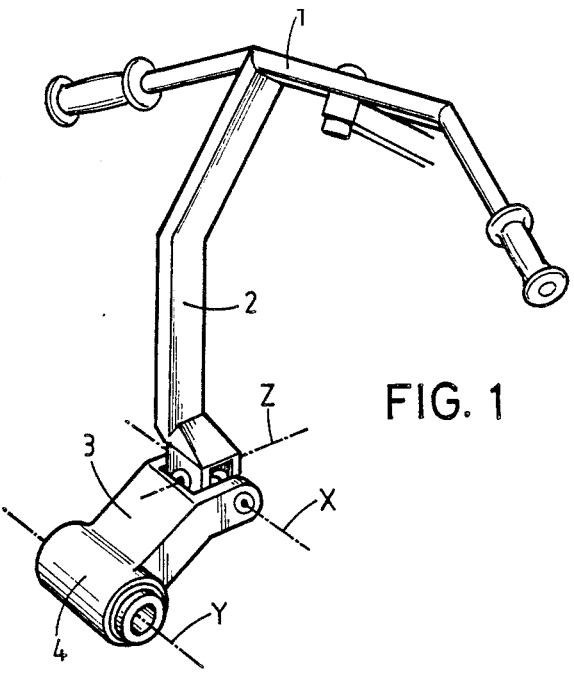
FIG. 1 is a schematic perspective view of it.
Figure 2:
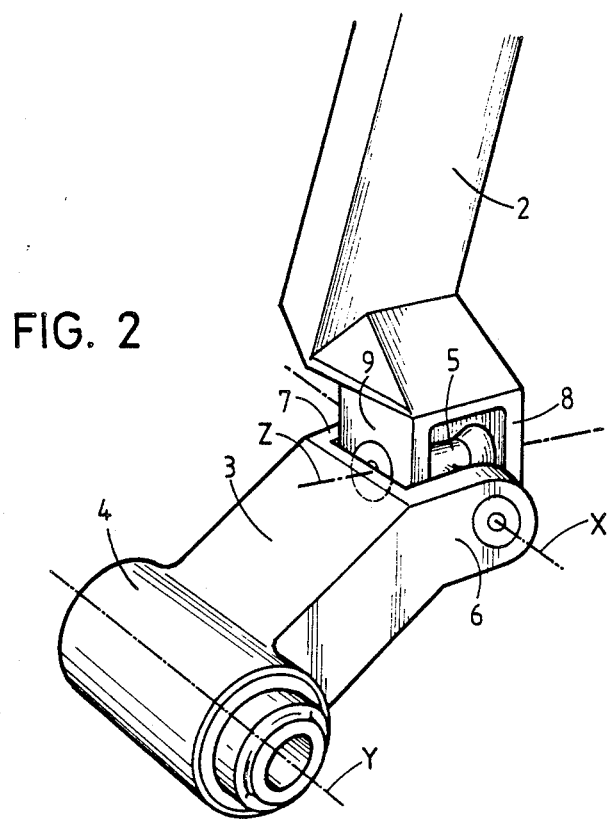
FIG. 2 is a partial view of it at greater scale also in perspective.
Figure 3:
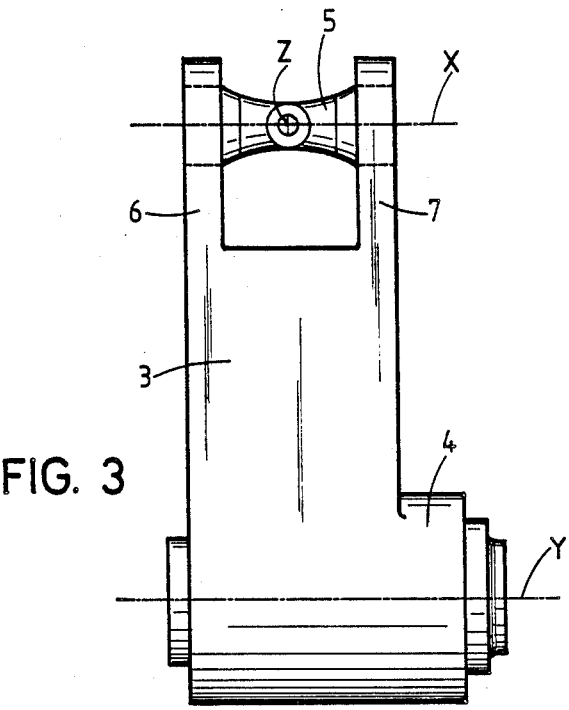
FIG. 3 is a plan view of the part receiving the axle of the wheel.
Figure 4:
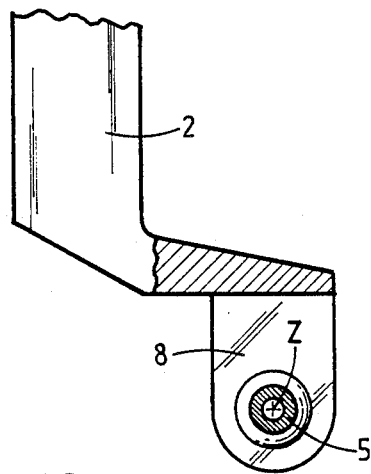
FIG. 4 is a partial plan view and partially in crosssection of the part fast with the handle bar.

The steering device shown comprises a handle bar 1 intended to be pivoted without play on a portion of the frame of the motor vehicle, particularly of a motorcycle, a side-car or a three-wheel vehicle, fixed a steering rod 2 which is usually bent or laterally displaced to pass on one side of the front wheel of the vehicle. This steering rod 2 is coupled to a support 3 fixed to the bearing 4 receiving the axle of the wheel. This support 3 is connected to the frame of the machine through the intermediary of the suspension of the vehicle. The coupling between the steering rod 2 and the support 3 is formed of a cardan or universal joint having a cross member 5 the arms of which are orthogonal and pivoted on the fork shaped end 6,7 of the support 3 respectively on the fork shaped end 8,9 of the steering rod 2.

To avoid any induced turning due to the working of the suspension it is necessary that the hinging axis X of the cross member 5 onto the fork 6,7 of the support 3 be located in a plane parallel to the axis Y of the bearing 4 and therefore to the axis of rotation of the wheel. Consequently the axis pivot 2 of the cross member 5 or the forks 8,9 the steering rod 2 is located in a plane perpendicular to the axis Y of the bearing 4.

In the preferred embodiment shown in the drawing the axis of the cross member 8 on the support 3 is parallel to the axis Y of the bearing 4.

In a variant it is possible to admit that the arms of the cross member 5 make one angle between them which is different from 90°.

Figure 5:
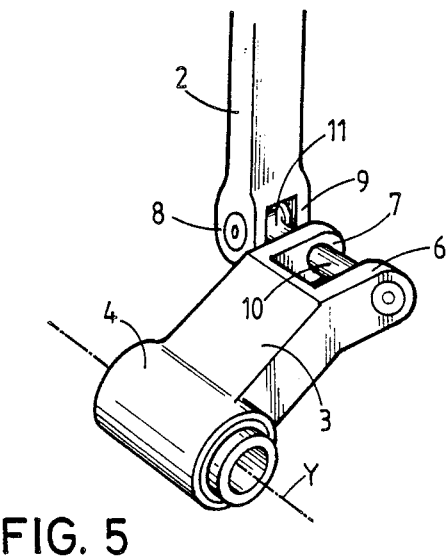
FIG. 5 is a perspective view of a second embodiment of the steering device according to the invention.

In the second embodiment of the steering device shown at FIG. 5, the universal joint connecting the steering bar 2 to the support 3 of the bearing, is replaced by a double hinge. This double hinge comprises a shaft 10 pivoted on the fork 6,7 of the support 3, this shaft extending laterally on one side out of said fork 6,7. The end of said shaft 10 is fixed to a pivot 11 forming an angle with the shaft 10, preferably of 90°, which is pivoted in the fork 8,9 of the steering bar 2 fixed to the handle bar 1.

In this realization, the shaft 10 is also located in a plane parallel to the axis Y of the bearing 4, preferably it is parallel to said axis Y. The result of such a double hinge connecting the support 3 to the steering bar 2 is identical to the cardan linkage previously described, it permit however to laterally displace the steering rod 2 what may have advantages in certain construction and may facilitate the positionning of said bar 2 with respect to the other elements, suspension, wheel, frame of the vehicle.

In a variant which is not shown the shaft 10 could have a perpendicular extension, either centered on the support 3, or laterally displaced.

The end of said extension would carry a shaft 11 perpendicular to the axis Y onto which the arm 2 and therefore the handle bar 1 would be hinged.

Generally speaking one obtains the cancelling of the induced turning by realizing a mechanical linkage between the handle bar 1 and the support 3 of the bearing 4 of the wheel which comprises a double articulation one of the pivot axis of which is contained in a plane parallel to the axis of said bearing 4.

What I claim is:

1. A steering device for a motor vehicle having a single front wheel, such as motor cycles, side cars and three-wheeled vehicles, which steering device comprises a handle bar pivotally mounted on a frame of the vehicle, said handle bar fixed to a first end of a steering rod to form a monolithic steering assembly, said steering assembly being offset from the plane of the wheel to be steered, a second end of said steering rod being connected by double articulation means to a support means for the bearing of said wheel, the pivot axis of said steering assembly on said support means residing in a plane which is parallel to the axis of said wheel bearing, and said wheel bearing support means being connected to the frame of said vehicle by suspension means.

2. The steering device of claim 1, wherein said double articulation means comprises a universal joint having a cross member.

3. The steering device of claim 2, wherein said cross member includes arms which are orthogonal with regard to each other.

4. The steering device of claim 2, wherein said cross member pivots on said support means about an axis which is parallel to the axis of said wheel bearing.

5. The steering device of claim 1, wherein said double articulation means includes a second shaft, fixed to a first shaft and forming an angle with same, which second shaft is pivotally mounted on said steering rod.

6. The steering device of claim 5, wherein said first shaft is pivotally mounted on said support means, the pivot axis of which is parallel to the axis of said wheel bearing, the pivot axis of said second shaft being perpendicular to said pivot axis of said first shaft.

7. The steering device of claim 5, wherein said first and second shafts are orthogonal.

* * * * *